United States Patent [19]

Fukushima

[11] Patent Number: 5,692,082

[45] Date of Patent: Nov. 25, 1997

[54] LASER DIODE MODULE AND DEPOLARIZER

[75] Inventor: Nobuhiro Fukushima, Kawasaki, Japan

[73] Assignee: Fujitsu Limited, Kawasaki, Japan

[21] Appl. No.: 549,935

[22] Filed: Oct. 30, 1995

[30] Foreign Application Priority Data

Mar. 17, 1995 [JP] Japan ................... 7-059546

[51] Int. Cl.$^6$ ................................................ G02B 6/36
[52] U.S. Cl. ................... 385/88; 385/93; 385/36; 385/33; 385/35
[58] Field of Search ............... 385/88–94, 33, 385/34, 35, 36, 1–4, 14

[56] References Cited

U.S. PATENT DOCUMENTS

| 4,375,910 | 3/1983 | Seki ............................ 385/1 |
| 5,276,747 | 1/1994 | Pan ............................. 385/34 |
| 5,291,571 | 3/1994 | Kunikane et al. ............... 385/93 |

FOREIGN PATENT DOCUMENTS 4-369888  12/1992  Japan .

*Primary Examiner*—Phan T. H. Palmer
*Attorney, Agent, or Firm*—Staas & Halsey

[57] ABSTRACT

A compact, inexpensive laser diode module having a depolarizer function of converting linearly polarized light into unpolarized light. The laser diode module includes a laser diode; a polarization-maintaining optical fiber arranged so that an axis of polarization of the fiber forms an angle of 45° with respect to a plane of polarization of incident light, the fiber having a length set so that an optical path difference between two polarization modes of transmitted light is greater than a coherence length of the incident light; and an optical coupling element for coupling emitting light from the laser diode to the polarization-maintaining optical fiber.

7 Claims, 4 Drawing Sheets

LASER DIODE MODULE AND DEPOLARIZER

BACKGROUND OF THE INVENTION

1. Field of the Invention

The present invention relates to a pigtail type of laser diode module for outputting unpolarized light, and also to a depolarizer for converting linearly polarized light into unpolarized light.

2. Description of the Related Art

In general, a laser diode (LD) widely used as a light source for an optical communication system outputs linearly polarized light (inclusive also of elliptically polarized light close to linearly polarized light). In the case where the characteristics of optical components, such as an optical branching coupler and an optical multiplexer, constituting the optical communication system have polarization dependency, incidence of linearly polarized light from the laser diode onto these optical components sometimes causes instability of the characteristics, which in turn causes a deterioration in transmission quality. It is therefore necessary to convert the linearly polarized light into unpolarized light, so as to avoid the characteristic instability even by the use of optical components having polarization dependency.

An example of a conventional depolarizer for converting linearly polarized light into unpolarized light is configured by joining two independent polarization-maintaining optical fibers (linear birefringent optical fibers) together in such a manner that the axes of polarization of the two optical fibers form an angle of 45° with respect to each other. Assuming that the plane of vibration of linearly polarized light is termed as a plane of polarization, the axis of polarization of the optical fiber is an axis with a direction where when linearly polarized light having a plane of polarization parallel to the direction is incident on the optical fiber, the plane of polarization of the linearly polarized light is preserved.

Further, an example of a conventional pigtail type of laser diode module is provided with a laser diode, a single-mode optical fiber for outputting light, a lens for coupling emitting light from the laser diode to the single-mode optical fiber, a photodiode for monitoring, and a Peltier element for temperature control. Conventionally, an input end of the above depolarizer is joined to an output end of the single-mode optical fiber of the above laser diode module, thereby converting linearly polarized light from the laser diode into unpolarized light.

As mentioned above, the conventional laser diode module does not function to output unpolarized light, but the above-mentioned fiber type of depolarizer must be connected to the laser diode module in order to obtain unpolarized light. As a result, the size of the whole as the assembly of the laser diode module and the depolarizer becomes large, and the number of joint positions (splice points) of optical fibers becomes also large to cause an increase in connection loss. Furthermore, in configuring an optical communication system, the connection and adjustment work for the laser diode module and the depolarizer is troublesome. In addition, the conventional depolarizer is very large in itself, and requires a precise adjustment work in the connection to another optical component.

SUMMARY OF THE INVENTION

It is therefore an object of the present invention to provide a compact, inexpensive laser diode module having a depolarizer function.

It is another object of the present invention to provide a depolarizer which allows a simple adjustment work in the connection to another optical component.

In accordance with an aspect of the present invention, there is provided a laser diode module comprising a laser diode; a polarization-maintaining optical fiber arranged so that an axis of polarization of the fiber forms an angle of 45° with respect to a plane of polarization of incident light, the fiber having a length set so that an optical path difference between two polarization modes of transmitted light is greater than a coherence length of the incident light; and optical coupling means for coupling emitting light from the laser diode to the polarization-maintaining optical fiber.

In accordance with another aspect of the present invention, there is provided a depolarizer for converting incident linearly polarized light into unpolarized light and outputting the unpolarized light, comprising an input port on which the linearly polarized light is incident; optical rotating means formed of an optical rotatory power substance and set so that an optical path difference between left circularly polarized light and right circularly polarized light is greater than a coherence length of the incident light from the input port; and an output port for emerging the unpolarized light from the optical rotating means.

According to the laser diode module to which the present invention is applied, the polarization-maintaining optical fiber is set in length so that the optical path difference between two orthogonal polarization modes (HEx mode and HEy mode) of transmitted light is greater than the coherence length of incident light, and linearly polarized light is incident on the polarization-maintaining optical fiber under the condition that the plane of polarization of the linearly polarized light is inclined 45° with respect to the axis of polarization of the polarization-maintaining optical fiber. Accordingly, the two polarization modes of the transmitted light are coupled, and unpolarized light whose direction of vibration is random is generated from an output end of the polarization-maintaining optical fiber. The laser diode module according to the present invention employs the polarization-maintaining optical fiber as an optical fiber (pigtail) for outputting emitting light from the laser diode. That is, the number of components of the laser diode module is similar to that of the conventional laser diode module, and a depolarizer function is possessed without complication of configuration. Accordingly, unlike the prior art, it is unnecessary to individually connect a depolarizer to the laser diode module, and it is possible to attain a reduction in loss of transmitted light, a reduction in size, and a reduction in cost.

According to the depolarizer to which the present invention is applied, the linearly polarized light from the laser diode is converted into the unpolarized light whose direction of vibration is random by the optical rotating means formed of an optical rotatory power substance. Accordingly, in contrast with the conventional depolarizer requiring precise adjustment in the connection of another optical component, the depolarizer according to the present invention eliminates the need for such precise adjustment to thereby render the connection work greatly simple.

Other objects and features of the invention will be more fully understood from the following detailed description and appended claims when taken with the accompanying drawings.

BRIEF DESCRIPTION OF THE DRAWINGS

DETAILED DESCRIPTION OF THE PREFERRED EMBODIMENTS (1) First Preferred Embodiment A laser diode module having a depolarizer function according to a first preferred embodiment of the present invention will now be described with reference to FIGS. 1 and 2. Referring to FIGS. 1 and 2, reference numeral 11 denotes a laser diode chip (LD chip) for outputting linearly polarized light having a given wavelength; reference numeral 12 denotes a polarization-maintaining optical fiber; and reference numeral 13 denotes a lens as an optical coupling element for collecting emitting light from the LD chip 11 and coupling the light to the polarization-maintaining optical fiber 12.

Figure 1:
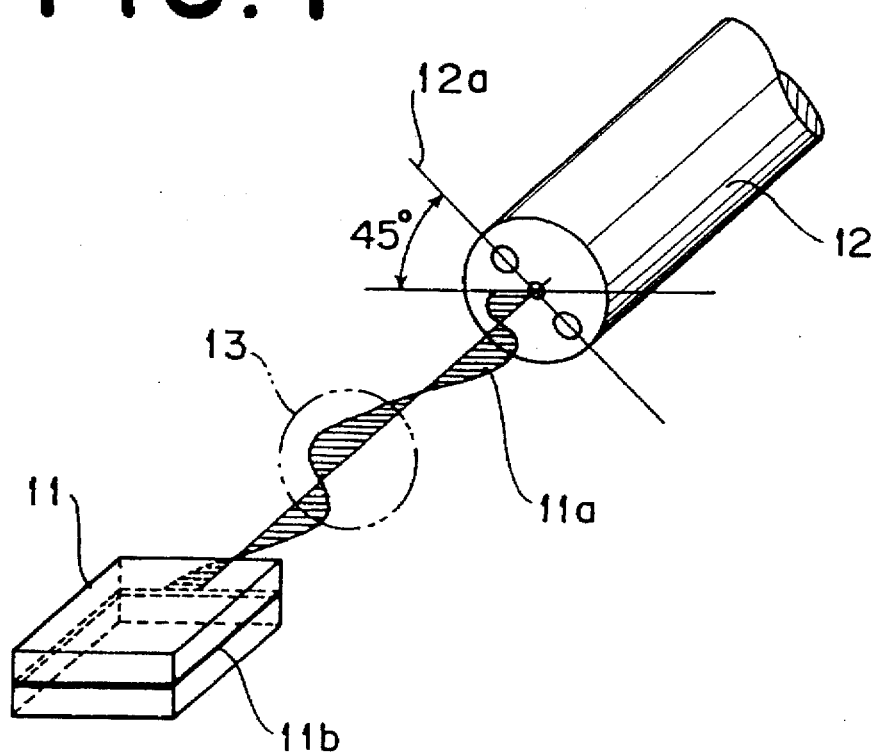
FIG. 1 is a perspective view showing an essential part of a laser diode module according to a first preferred embodiment of the present invention.
Figure 2:
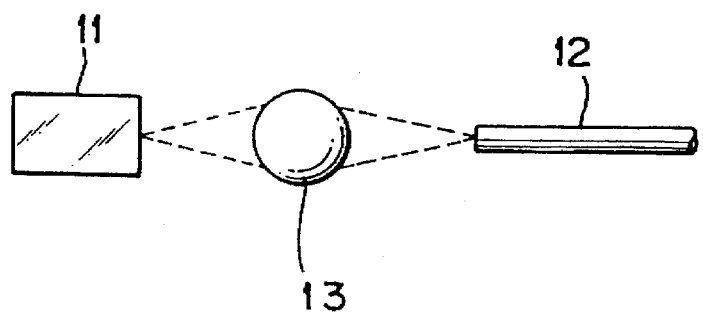
FIG. 2 is a side view of the essential part of the laser diode module shown in FIG. 1.

The polarization-maintaining optical fiber 12 is a linear birefringent optical fiber in which stress imparting portions are formed on both sides of a core to give anisotropy to the refractive indices in x-and y-directions, thereby making a difference in the propagation constant between two orthogonal polarization modes (HEx mode and HEy mode). The polarization-maintaining optical fiber 12 is arranged so that an axis of polarization 12a of the fiber 12 forms an angle of 45° with respect to a plane of polarization 11a of the linearly polarized light emerged from the LD chip 11. In other words, the polarization-maintaining optical fiber 12 is arranged so that the axis of polarization 12a forms an angle of 45° with respect to an active layer 11b of the LD chip 11. The linearly polarized light termed herein is light vibrating in a certain plane, and it also includes elliptically polarized light close to linearly polarized light. The plane of polarization is a plane of vibration of the linearly polarized light, and the axis of polarization of the polarization-maintaining optical fiber is an axis with a direction where when linearly polarized light having a plane of polarization parallel to the direction is incident on the fiber, the plane of polarization of the linearly polarized light is preserved. The length of the polarization-maintaining optical fiber 12 is set so that the optical path difference between the two orthogonal polarization modes (HEx mode and HEy mode) of transmitted light is greater than the coherence length of the light by the LD chip 11.

The emitting light from the LD chip 11 is collected by the lens 13, and is then incident on the polarization-maintaining optical fiber 12 with the plane of polarization 11a of the light being inclined 45° with respect to the axis of polarization 12a of the fiber 12. Further, the optical path difference between the two orthogonal polarization modes of the light transmitted through the polarization-maintaining optical fiber 12 is greater than the coherence length of the light by the LD chip 11 as mentioned above. Accordingly, coupling is made between these two polarization modes, thereby generating unpolarized light whose direction of vibration is random, from an output end of the polarization-maintaining optical fiber 12. The optical path difference between the two orthogonal polarization modes is proportional to the length of the polarization-maintaining optical fiber 12, and for a usual exciting LD, enough unpolarized light can be obtained by setting the length of the polarization-maintaining optical fiber 12 to about 2 to 3 m.

Thus, in view of the fact that the emitting light from the LD chip 11 is linearly polarized light, the polarization-maintaining optical fiber 12 is used as an optical fiber (pigtail) for coupling light from a laser diode module to another optical component, wherein the polarization-maintaining optical fiber 12 is arranged in the above-mentioned specific positional relationship with the LD chip 11, and the length of the fiber 12 is set as mentioned above, thereby realizing the laser diode module having a depolarizer function. Accordingly, as compared with the configuration of a generally adopted, conventional laser diode module, the laser diode module having a depolarizer function according to this preferred embodiment can be configured easily and inexpensively without complication of configuration, because it is only necessary to change an outputting optical fiber to the polarization-maintaining optical fiber. Further, unlike the prior art, it is unnecessary to connect a depolarizer to the laser diode module, so that the number of splice points can be reduced to thereby reduce the connection loss of transmitted light, and a great reduction in size can also be achieved.

(2) Second Preferred Embodiment

Figure 3:
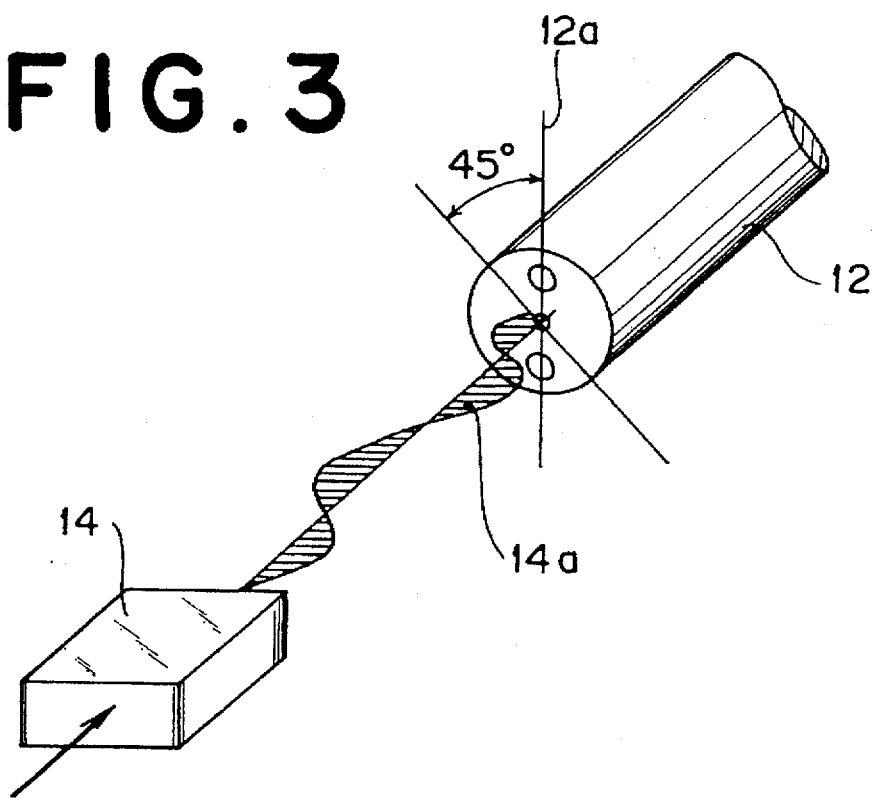
FIG. 3 is a perspective view showing an essential part of a laser diode module according to a second preferred embodiment of the present invention.
Figure 4:
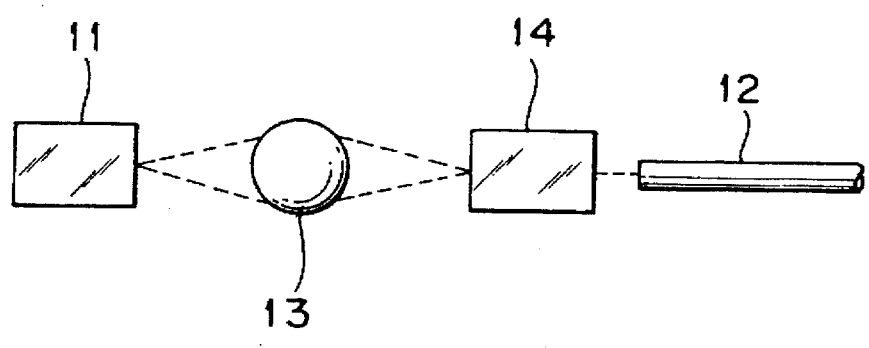
FIG. 4 is a side view of the laser diode module shown in FIG. 3.

A laser diode module having a depolarizer function according to a second preferred embodiment of the present invention will now be described with reference to FIGS. 3 and 4. As shown in FIGS. 3 and 4, the optical isolator 14 is located between the lens 13 and the polarization-maintaining optical fiber 12. The polarization-maintaining optical fiber 12 is arranged so that the axis of polarization 12a of the fiber 12 forms an angle of 45° with respect to a plane of polarization 14a of emergent light from the optical isolator 14. The other configuration is similar to that of the first preferred embodiment.

(3) Third Preferred Embodiment

Figure 5:
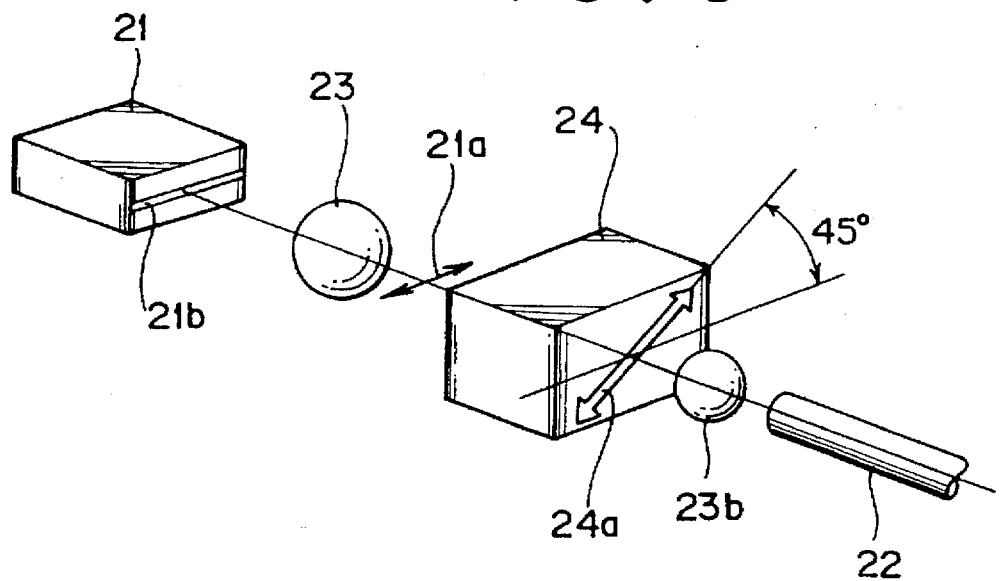
FIG. 5 is a perspective view showing an essential part of a laser diode module according to a third preferred embodiment of the present invention.

A laser diode module having a depolarizer function according to a third preferred embodiment of the present invention will now be described with reference to FIG. 5. Referring to FIG. 5, reference numeral 21 denotes a laser diode chip (LD chip) for outputting linearly polarized light having a given wavelength reference numeral 22 denotes a single-mode optical fiber; reference numerals 23 and 23b denote lenses as optical coupling elements; and reference numeral 24 denotes a birefringent crystal plate. The birefringent crystal plate 24 is a plate member formed of a crystal material exhibiting large birefringence, such as futile or calcite. The birefringent crystal plate 24 is arranged so that an optic axis 24a of the plate 24 forms an angle of 45° with respect to a plane of polarization 21a of linearly polarized light emerged from the LD chip 21. In other words, the birefringent crystal plate 24 is arranged so that the optic axis 24a forms an angle of 45° with respect to an active layer 21b of the LD chip 21. The linearly polarized light termed herein is light vibrating in a certain plane, and it also includes elliptically polarized light close to linearly polarized light. The plane of polarization is a plane of vibration of the linearly polarized light, and the optic axis of the birefringent crystal plate is an axis with a direction where the velocities of an ordinary ray and an extraordinary ray are equal to each other. The thickness of the birefringent crystal plate 24 traversed by light is set so that the optical path difference between the ordinary ray and the extraordinary ray is greater than the coherence length of the light by the LD chip 21.

The emitted light from the LD chip 21 is collected by the lens 23, and is then incident on the birefringent crystal plate 24 with the plane of polarization 21a of the light being inclined 45° with respect to the optic axis 24a of the plate 24. Further, the optical path difference between the ordinary ray and the extraordinary ray transmitted through the birefringent crystal plate 24 is greater than the coherence length of the light by the LD chip 21 as mentioned above. Accordingly, unpolarized light whose direction of vibration is random is generated from an output end of the birefringent crystal plate 24, and is transmitted through the lens 23b to come to incidence on the single-mode optical fiber 22. The optical path difference between the ordinary ray and the extraordinary ray is proportional to the thickness of the birefringent crystal plate 24, and for a usual exciting LD, enough unpolarized light can be obtained by setting the thickness of the birefringent crystal plate 24 to about 5 mm.

According to this preferred embodiment, the single-mode optical fiber 22 similar to a conventional one is used as an optical fiber for coupling light to another optical component, and the birefringent crystal plate 24 having the above-specified thickness is added as a component so as to satisfy the above-mentioned positional relationship, thereby realizing the laser diode module having a depolarizer function.

Accordingly, as compared with the configuration of a generally adopted, conventional laser diode module, the laser diode module having a depolarizer function according to this preferred embodiment can be configured easily without so much complication of configuration, because it is only necessary to add the birefringent crystal plate 24. Further, unlike the prior art, it is unnecessary to connect a depolarizer to the laser diode module, so that the number of splice points can be reduced to thereby reduce the connection loss of transmitted light, and a great reduction in size can also be achieved. In addition, the size can be more reduced than that of the laser diode module of the first preferred embodiment.

(4) Fourth Preferred Embodiment

Figure 6:
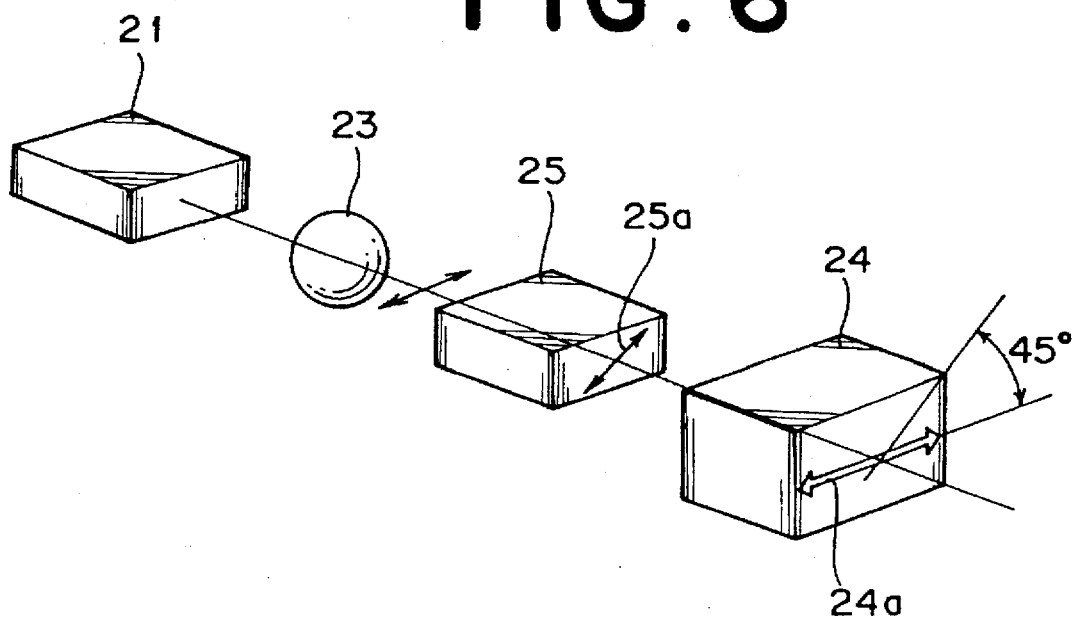
FIG. 6 is a perspective view showing an essential part of a laser diode module according to a fourth preferred embodiment of the present invention.

A laser diode module having a depolarizer function according to a fourth preferred embodiment of the present invention will now be described with reference to FIG. 6. As shown in FIG. 6, the optical isolator 25 is located between the lens 23 and the birefringent crystal plate 24. The birefringent crystal plate 24 is arranged so that the optic axis 24a of the plate 24 forms an angle of 45° with respect to a plane of polarization 25a of emergent light from the optical isolator 25. The other configuration is similar to that of the third preferred embodiment.

(5) Fifth Preferred Embodiment

Figure 7:
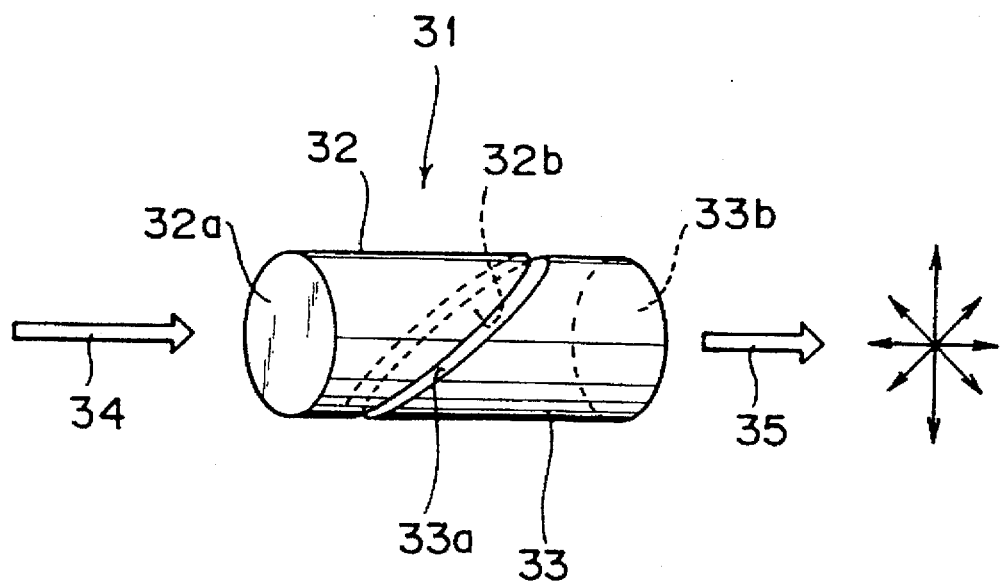
FIG. 7 is a perspective view showing an essential part of a depolarizer according a fifth preferred embodiment of the present invention.

A depolarizer according to a fifth preferred embodiment of the present invention will now be described with reference to FIG. 7. Referring to FIG. 7, reference numeral 31 denotes optical rotating means formed of an optical rotatory power substance and set so that the optical path difference between left circularly polarized light and right circularly polarized light is greater than the coherence length of incident light 34. The optical rotating means 31 is composed of a first rotator 32 and a second rotator 33. The first rotator 32 is formed of a dextrorotatory substance, having a first incident surface 32a lying upstream of the propagation direction of the incident light 34 from an input port and formed perpendicular to the propagation direction, and having a first emergent surface 32b lying downstream of the propagation direction of the incident light 34 and formed obliquely to the propagation direction. The second rotator 33 is formed of a levorotatory substance, having a second incident surface 33a lying upstream of the propagation direction of the incident light from the first rotator 32 and formed obliquely to the propagation direction so as to correspond to the first emergent surface 32b, and having a second emergent surface 33b lying downstream of the propagation direction of the incident light from the first rotator 32 and formed parallel to the first incident surface 32a. The optical rotating means 31 is formed as a generally platelike member by joining the first emergent surface 32b of the first rotator 32 and the second incident surface 33a of the second rotator 33.

The first rotator 32 and the second rotator 33 are formed of substances having optical rotatory power, such as quartz, tartaric acid, Rochelle salt, grape sugar, and liquid crystal. The optical rotatory power is a phenomenon (property) that an optical path difference appears between right circularly polarized light and left circularly polarized light. This phenomenon is basically similar to the phenomenon that birefringence exhibits an optical path difference between an ordinary ray and an extraordinary ray. In this preferred embodiment, the optical path difference between the right circularly polarized light and the left circularly polarized light is greater than the coherence length of the incident light 34 by a light source, thereby converting the incident linearly polarized light 34 into unpolarized light 35 to be output.

In contrast with the conventional depolarizer requiring angle adjustment in the connection to another optical component (e.g., laser diode module), the depolarizer according to this preferred embodiment does not require such angle adjustment, provided that the incident light is linearly polarized light, thus greatly facilitating the connection work. This effect is due to the fact that linearly polarized light contains right circularly polarized light and left circularly polarized light in equal amounts. It is to be understood that the depolarizer according to this preferred embodiment does not function when circularly polarized light is incident thereon. However, in most cases, the problem on polarization dependency occurs usually when the incident light is linearly polarized light, whereas when the incident light is circularly polarized light, there is almost no problem because no conversion of circularly polarized light may be allowed. The first rotator 32 may be formed of a levorotatory substance, and the second rotator 33 may be formed of a dextrorotatory substance.

(6) Sixth Preferred Embodiment

Figure 8:
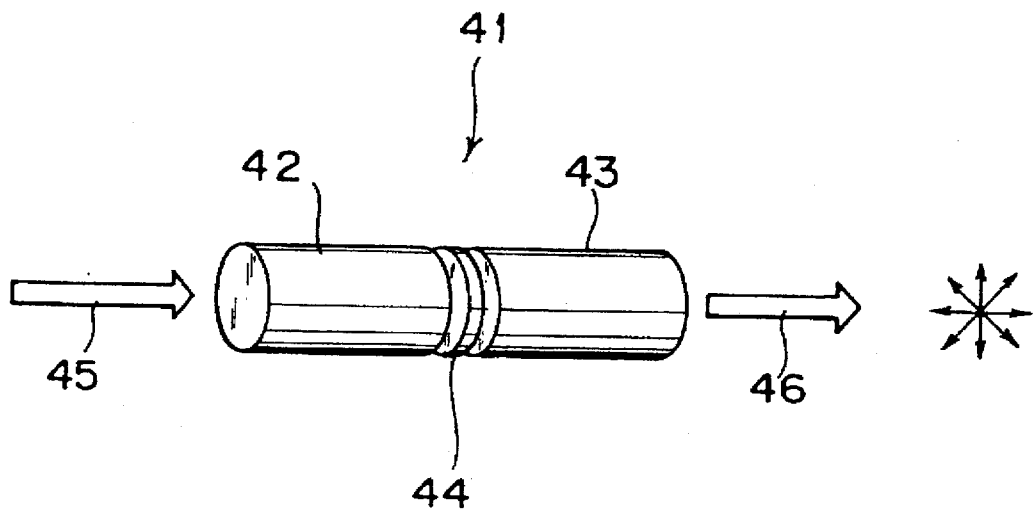
FIG. 8 is a perspective view showing an essential part of a depolarizer according to a sixth preferred embodiment of the present invention.

A depolarizer according to a sixth preferred embodiment of the present invention will now be described with reference to FIG. 8. In contrast with the fifth preferred embodiment wherein when circularly polarized light is incident on the depolarizer, it cannot be converted into unpolarized light, the sixth preferred embodiment is characterized in that incident circularly polarized light can also be converted into unpolarized light. Referring to FIG. 8, reference numeral 41 denotes optical rotating means formed of an optical rotatory power substance and set so that the optical path difference between left circularly polarized light and right circularly polarized light is greater than the coherence length of incident light 45. The optical rotating means 41 is composed of a first rotator 42 formed of a dextrorotatory substance, a second rotator 43 formed of a levorotatory substance, and a λ/4 wave plate (quarter-wave plate) 44. The first rotator 42, the second rotator 43, and the λ/4 wave plate 44 are formed as platelike members, and the optical rotating means 41 is formed generally as a platelike member by joining the first rotator 42 and the second rotator 43 together with the λ/4 wave plate 44 interposed therebetween. As similar to the fifth preferred embodiment, the first rotator 42 and the second rotator 43 are formed of substances having optical rotatory power, such as quartz, tartaric acid, Rochelle salt, grape sugar, and liquid crystal.

With this configuration, not only linearly polarized light but also circularly polarized light can be converted into unpolarized light 46. The other configuration is similar to that of the fifth preferred embodiment. The first rotator 42 may be formed of a levorotatory substance, and the second rotator 43 may be formed of a dextrorotatory substance. Thus, the combination of the levorotatory substance and the dextrorotatory substance for the first and second rotators 42 and 43 is not limitative. For example, both the first and second rotators 42 and 43 may be formed of a dextrorotatory substance, or may be formed of a levorotatory substance.

What is claimed is:

1. A laser diode module comprising:

a laser diode;

a polarization-maintaining optical fiber arranged so that an axis of polarization of said fiber forms an angle of 45° with respect to a plane of polarization of incident light, said fiber having a length set so that an optical path difference between two polarization modes of transmitted light is greater than a coherence length of said incident light; and optical coupling means for coupling emitting light from said laser diode to said polarization-maintaining optical fiber.

2. A laser diode module according to claim 1, further comprising an optical isolator located between said optical coupling means and said polarization-maintaining optical fiber.

3. A laser diode module comprising:

a laser;

an optical fiber;

optical coupling means for optically coupling said laser diode and said optical fiber; and a birefringent crystal means provided between said laser diode and said optical fiber and arranged so that an optic axis of said birefringent crystal means forms an angle of 45° with respect to a plane of polarization of incident light, said optic axis being substantially perpendicular to a propagating direction of said incident light, said birefringent crystal means being set so that an optical path difference between an ordinary ray and an extraordinary ray is greater than a coherence length of said incident light.

4. A laser diode module according to claim 3, wherein said optical coupling means comprises a first lens disposed between said laser diode and said birefringent crystal means and a second lens disposed between said birefringent crystal means and said optical fiber, said laser diode module further comprising an optical isolator located between said first lens and said birefringent crystal means.

5. A depolarizer for converting incident linearly polarized light into unpolarized light and outputting said unpolarized light, comprising:

an input port on which said linearly polarized light is incident;

optical rotating means formed of an optical rotatory power substance and set so that an optical path difference between left circularly polarized light and right circularly polarized light is greater than a coherence length of said incident light; and an output port for emerging said unpolarized light from said optical rotating means.

6. A depolarizer according to claim 5, wherein said optical rotating means comprises:

a first rotator formed of a substance having optical rotatory power, said first rotator having a first incident surface lying upstream of a propagation direction of said incident light and formed perpendicular to said propagation direction, and having a first emergent surface lying downstream of said propagation direction and formed obliquely of said propagation direction; and a second rotator formed of a substance having optical rotatory power opposite in direction to that of said first rotator, said second rotator having a second incident surface lying upstream of a propagation direction of light emergent from said first rotator and formed obliquely to said propagation direction so as to correspond to said first emergent surface, and having a second emergent surface lying downstream of said propagation direction and formed parallel to said first incident surface.

7. A depolarizer according to claim 5, wherein said optical rotating means comprises:

a first rotator formed of a substance having optical rotatory power, said incident light being incident on said first rotator;

a quarter-wave plate on which light emergent from said first rotator is incident; and a second rotator formed of a substance having optical rotatory power, light emergent from said quarter-wave plate being incident on said second rotator.

* * * * *

UNITED STATES PATENT AND TRADEMARK OFFICE
CERTIFICATE OF CORRECTION

PATENT NO. : 5,692,082
DATED : November 25, 1997
INVENTOR(S) : Nobuhiro FUKUSHIMA It is certified that error appears in the above-indentified patent and that said Letters Patent is hereby corrected as shown below:

Col. 4, line 13, change "2to" to --2 to--.
Col. 7, line 42, after "laser" insert --diode--.

Signed and Sealed this

Twenty-fourth Day of February, 1998

Attest:

BRUCE LEHMAN

Attesting Officer        Commissioner of Patents and Trademarks